No. 896,324. PATENTED AUG. 18, 1908.
W. E. RICKEY & A. C. SMITH.
STEAM ENGINE REVERSE VALVE.
APPLICATION FILED OCT. 1, 1907.

2 SHEETS—SHEET 1.

WITNESSES:

INVENTORS:
A. C. Smith
W. E. Rickey.
BY
Attorneys

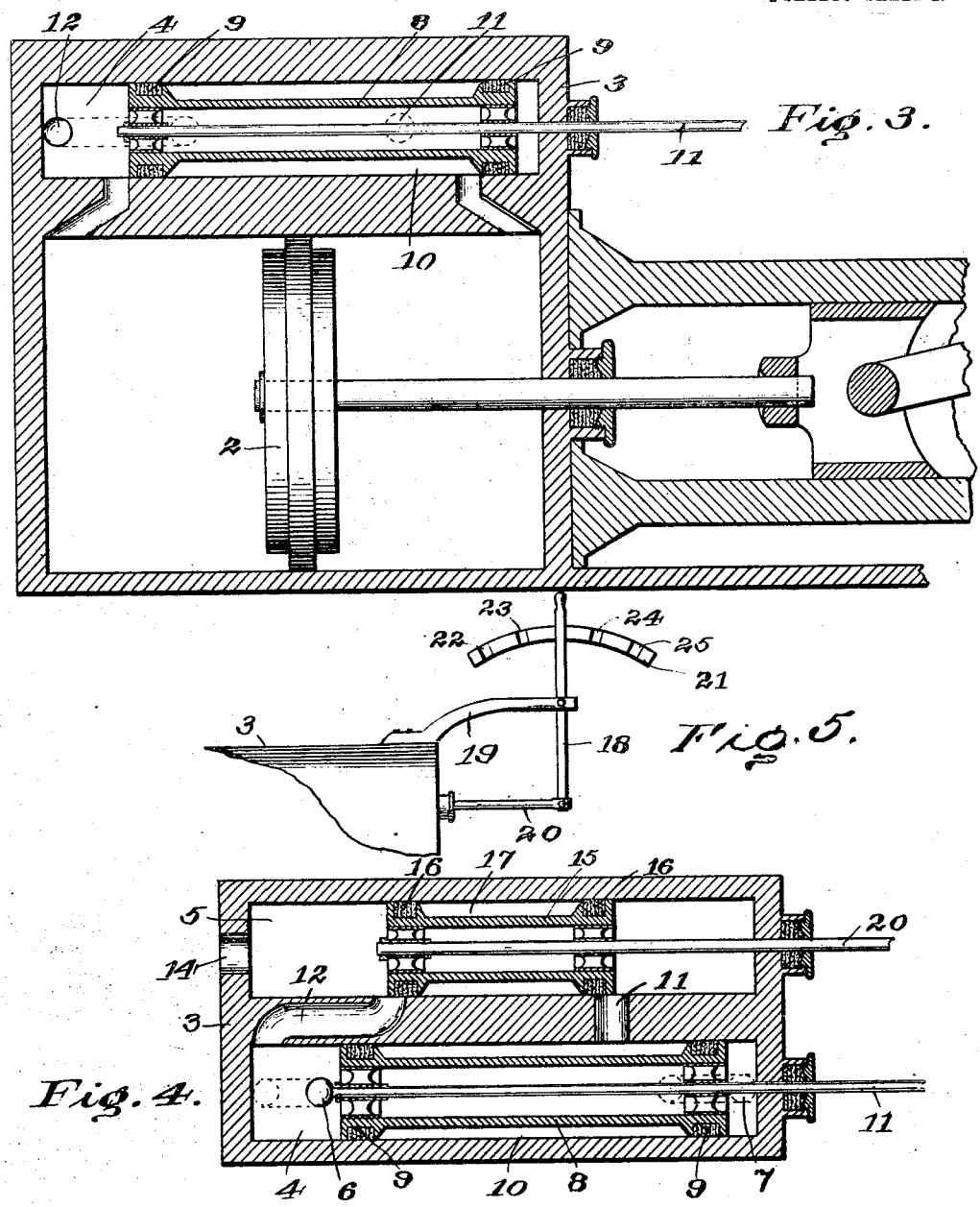

UNITED STATES PATENT OFFICE.

WILLIAM E. RICKEY AND ALEXANDER C. SMITH, OF ROCKY, OKLAHOMA.

STEAM-ENGINE REVERSE-VALVE.

No. 896,324.      Specification of Letters Patent.      Patented Aug. 18, 1908.

Application filed October 1, 1907. Serial No. 395,377.

*To all whom it may concern:*

Be it known that we, WILLIAM E. RICKEY and ALEXANDER C. SMITH, citizens of the United States, residing at Rocky, in the county of Washita and State of Oklahoma, have invented certain new and useful Improvements in Steam-Engine Reverse-Valves, of which the following is a specification.

The present invention relates in general to steam engines and more particularly to a novel valve mechanism for reversing the same.

The invention contemplates the provision of a peculiarly designed valve which operates to produce an air brake for immediately stopping the engine as soon as the supply of motive fluid has been shut off.

A further object of the invention is to construct a valve which permits the condensation produced when starting the engine to be blown off through the exhaust of the reverse valve before entering the cylinder and thereby enables dry steam to be always had for starting the engine.

Figure 1:
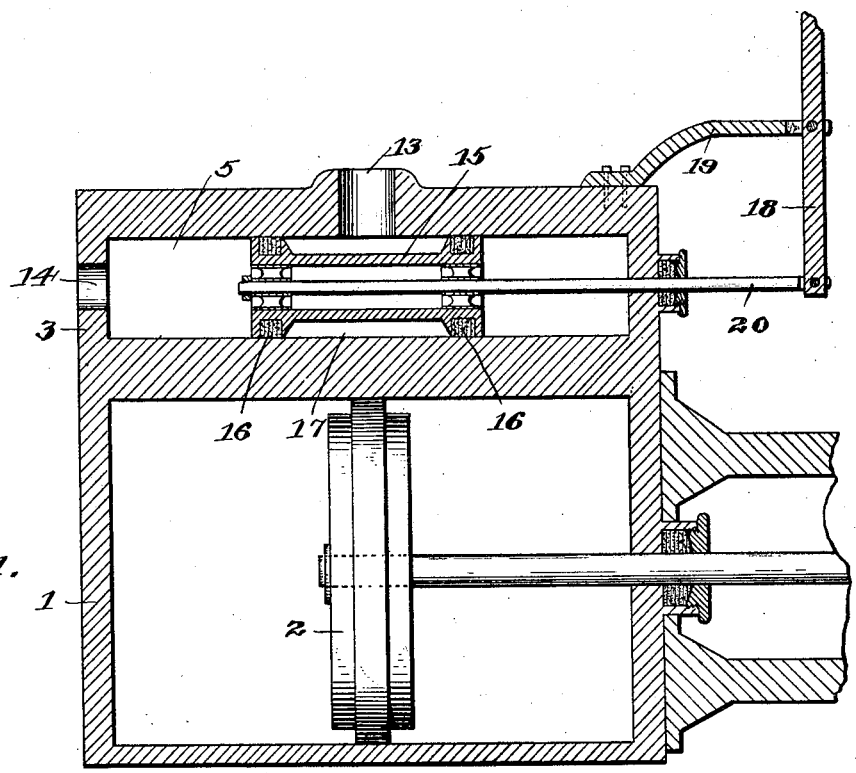
Figure 2:
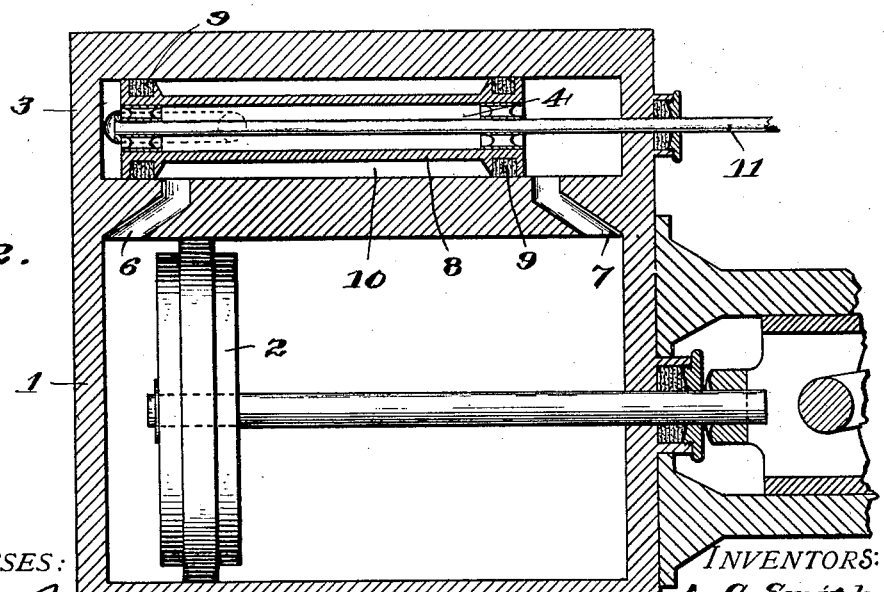

For a full description of the invention and the merits thereof and also to acquire a knowledge of the details of construction and the means for effecting the result, reference is to be had to the following description and accompanying drawings, in which:

Figure 1 is a longitudinal sectional view through a steam cylinder and valve chest, showing the reversing valve. Fig. 2 is a similar view showing the slide valve. Fig. 3 is a view similar to Fig. 2 showing the slide valve at the opposite extreme of its movement. Fig. 4 is a horizontal sectional view through the steam chest showing both the slide and reversing valves. Fig. 5 is a view of the lever mechanism for controlling the reversing valve.

Corresponding and like parts are referred to in the following description and indicated in all the views of the drawings by the same reference characters.

Specifically describing the present embodiment of the invention the numeral 1 designates the cylinder of a steam engine and 2 a piston of any approved construction which is mounted to reciprocate within the cylinder and may be connected to a drive shaft in any desired manner. A steam chest 3 is located upon one side of the cylinder 1 and is subdivided into a pair of chambers 4 and 5, the chamber 4 having the slide valve mounted therein while the reversing valve is mounted within the chamber 5. Opposite ends of the cylinder 1 communicate with the slide chamber 4 through the ports 6 and 7, the said ports entering the slide chamber at points spaced from the opposite ends thereof. Slidably mounted within this valve chamber 4 is a tubular valve 8 provided at its opposite ends with the annular packing rings 9 which produce a steam tight joint with the walls of the chamber. It will be observed that the body portion of the tubular valve 8 is somewhat smaller than the chamber 4 and that an annular space 10 is provided upon the exterior of the valve member and between the packing rings 9 which is shut off from the remaining portion of the chamber. A rod 11$^a$ is connected to the slide valve 8 and passes through a packing box at one end of the steam chest, the said rod having an operative connection in any approved manner with an eccentric upon the drive shaft and serving to reciprocate the slide valve 8 back and forth within the chamber 4 so as to throw the ports 6 and 7 alternately in communication with the annular space 10 surrounding the slide valve and the chamber 4.

Leading from the reversing chamber 5 to the valve chamber 4 are the ports 11 and 12, the former being designed to always communicate with the annular space 10 upon the exterior of the slide valve 8, while the latter communicates with one end of the slide-valve chamber 4. The steam supply pipe 13 enters the reversing chamber 5 at one side thereof while the exhaust port 14 is located at one end of the chamber. Slidably mounted within the chamber 5 to reciprocate back and forth within the same is the tubular valve 15 which is somewhat smaller than the chamber and is provided at its opposite ends with the annular packing rings 16 producing a steam tight joint with the walls of the chamber, an annular space 17 similar to the before mentioned annular space 10 being provided upon the exterior of the reversing valve between the said packing rings. This annular space 17 is always in communication with the steam inlet 13 while the remaining portion of the chamber 5 is always in communication with the outlet 14. These packing rings 16 are of such size as to close either of the ports 11 and 12 and the reversing valve 15 is of such a length that when one of the ports is thus closed, the opposite port is in direct communication with the exhaust and the opposite packing ring is located between the two ports.

A lever 18 is utilized for actuating the reversing valve, the said lever being pivotally mounted at an intermediate point upon a bracket 19 and one end of the lever being connected to a rod 20 extending through a packing box at one end of the steam chest and engaging the reversing valve, while the opposite end of the lever engages a segmental rack 21. In the present instance this rack 21 is provided with the four stops 22, 23, 24 and 25 for engaging the lever. When the said lever is moved to either extreme and engaged by either of the stops 22 or 25, the reversing valve is shifted so that the annular space 17 establishes communication with the steam inlet 13 and one of the ports 11 or 12, the opposite port being in direct communication with the exhaust 14. It will thus be apparent that by moving the lever 18 either from the stop 22 to the stop 25 or vice versa the direction of the flow of steam will be reversed and the motion of the engine correspondingly reversed.

Under some conditions as when going down a steep grade with a traction engine or when lowering a cage in a mine it is desirable to provide an air cushion for stopping the engine, and provision is made for this exigency as follows: Suppose the lever 18 to be moved into engagement with the notch 25, thereby throwing the reversing valve to the limit of its movement to the left. Then with the slide valve in the position shown in Fig. 2 the motive fluid will enter the valve chamber 4 through the port 12 and will pass into the cylinder through the port 6, the piston 2 being on its movement from left to right. Should the lever 18 be then suddenly moved into engagement with the notch 23 the reversing valve will be moved so that the packing ring 16 at the right end thereof covers the port 11 while the packing ring 16 at the left end thereof has been moved beyond the port 12 and leaves the latter unobstructed. The air to the right of the piston 2 will then be entrapped within the cylinder so as to form an air cushion, since the port 11 through which the said air was being exhausted has been closed by the reversing valve. Should it for any reason be desired to shut off the supply of motive fluid without producing this air brake, the lever 18 is caused to engage the notch 24, thereby moving the reversing valve so that the packing ring 16 at the left end thereof closes the port 12, the port 11 being unobstructed. With this position of the ports it will be readily apparent that as the piston 2 continues in its movement from left to right the air to the right of the said piston will be exhausted through the port 11, the piston merely tending to produce a vacuum within the space to the left thereof. Supposing however that the lever 18 is in engagement with the notch 22 with the reversing valve shifted to the limit of its movement to the right and the port 11 in communication with the steam inlet 13 and the port 12 in communication with the exhaust. Then assuming the piston 2 to be in the position shown in Fig. 3 and moving from right to left, the exhaust passing through the port 6 into the chamber 4 and thence through the port 12 into the chamber 5 while the live steam enters the cylinder to the right of the piston through the port 7. Should the lever 18 be then moved into engagement with the notch 24 the packing ring 16 at the left of the reversing valve will close the port 12, thereby shutting off the exhaust for the air to the left of the piston and causing the same to be entrapped within the cylinder so as to form an air cushion. When the piston reaches the limit of its movement to the left and starts to move from left to right the slide valve will shift so as to trap the air upon the right of the piston, an air cushion being thereby alternately produced upon opposite sides of the piston until the engine comes to a stop. In a manner similar to that previously described it will also be apparent that should the lever 18 have been placed in engagement with the notch 23 instead of the notch 24, the air in front of the piston would have been exhausted in the usual manner and the piston would merely have had a tendency to produce a vacuum upon the opposite side thereof, the supply of motive fluid being cut off.

A further advantage of this construction resides in the fact that it permits of the running of the engine with dry steam, since by starting the engine in the reverse direction to that in which it is desired to run the same, the condensation will be deposited in the reversing chamber 5. Then when the engine is reversed and caused to run in the desired direction the condensed steam will be blown through the exhaust 14 without having entered the cylinder, thereby eliminating the objections incident to forcing the condensed steam through the usual cylinder cocks.

Having thus described the invention what is claimed as new is:

1. In a device of the character described, the combination of a cylinder having a piston mounted therein, a valve chest, and a pair of valves mounted within the valve chest and coöperating with each other to alternately admit motive fluid to opposite ends of the cylinder, one of the valves being constructed so as to either reverse the engine or cut off the supply of motive fluid and alternately produce an air cushion on opposite sides of the piston.

2. In a device of the character described, the combination of a cylinder having a piston mounted therein, a valve chest, a slide valve mounted within the valve chest, and a reversing valve communicating with the slide valve through a pair of ports, the said reversing valve being adapted to be moved so as to close either of the ports, thereby shutting off the supply of motive fluid and producing an air cushion alternately upon opposite sides of the piston.

3. In a device of the character described, the combination of a cylinder having a piston mounted therein, a steam chest formed with a valve chamber and a reversing chamber, the said chambers communicating with each other through a pair of ports, a slide valve mounted within the valve chamber, and a tubular reversing valve slidably mounted within the reversing chamber, the said tubular reversing valve being formed with packing rings adapted to close either of the before mentioned ports, thereby shutting off the supply of motive fluid and alternately producing an air cushion on opposite sides of the piston.

4. In a device of the character described, the combination of a cylinder having a piston mounted therein, a valve chest formed with a valve chamber and a reversing chamber, the latter communicating with an inlet opening and an exhaust and the two chambers communicating with each other through a pair of ports, a tubular slide valve mounted within the valve chamber and provided at its ends with packing rings engaging the walls of the chamber to form an annular space upon the exterior of the cut-off valve, the said annular space and valve chamber being thrown alternately into communication with the opposite ends of the cylinder, and a tubular reversing valve slidably mounted within the reversing chamber and provided at its ends with packing rings engaging the walls of the chamber to form an annular space adapted to throw the inlet opening into communication with either the annular space surrounding the slide valve or the valve chamber, the packing rings of the reversing chamber being adapted to close either of the before mentioned ports between the two chambers, thereby shutting off the supply of motive fluid and alternately forming an air cushion upon opposite sides of the piston.

In testimony whereof we affix our signatures in presence of two witnesses.

WILLIAM E. RICKEY. [L. S.]
ALEXANDER C. SMITH. [L. S.]

Witnesses:
DANIEL SHEAN,
S. WILKINSON.